US009558197B2

(12) United States Patent (10) Patent No.: US 9,558,197 B2
Goldberg et al. (45) Date of Patent: Jan. 31, 2017

(54) ASSIGNING BACKUP DEVICE PATH BASED ON FILE COLORING

(71) Applicant: INTERNATIONAL BUSINESS MACHINES CORPORATION, Armonk, NY (US)

(72) Inventors: Itzhack Goldberg, Hadera (IL); Alexander Jung, Kleinkahl (DE); Frank Krick, Ockenheim (DE); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 14/170,244

(22) Filed: Jan. 31, 2014

(65) Prior Publication Data
US 2015/0220564 A1 Aug. 6, 2015

(51) Int. Cl.
*G06F 11/14* (2006.01)
*G06F 17/30* (2006.01)

(52) U.S. Cl.
CPC ....... *G06F 17/3015* (2013.01); *G06F 11/1453* (2013.01); *G06F 11/1464* (2013.01); *G06F 11/1471* (2013.01); *G06F 17/30008* (2013.01)

(58) Field of Classification Search
None
See application file for complete search history.

(56) References Cited

U.S. PATENT DOCUMENTS

| | | | | |
|---|---|---|---|---|
| 7,966,363 | B2 * | 6/2011 | Boehm | G05B 23/0272 709/201 |
| 2004/0061701 | A1 * | 4/2004 | Arquie | H04L 41/12 345/440 |
| 2004/0215764 | A1 * | 10/2004 | Allen | H04L 41/12 709/224 |
| 2005/0015662 | A1 | 1/2005 | Scanlan | |
| 2006/0122956 | A1 * | 6/2006 | Shimogori | G06F 17/30011 |
| 2007/0061385 | A1 | 3/2007 | Clark et al. | |
| 2011/0276921 | A1 | 11/2011 | Long | |
| 2012/0185438 | A1 | 7/2012 | Giampaolo et al. | |
| 2012/0253891 | A1 | 10/2012 | Hayes et al. | |
| 2014/0189680 | A1 * | 7/2014 | Kripalani | G06F 11/3664 717/176 |

FOREIGN PATENT DOCUMENTS

EP 2189905 A1 5/2010

OTHER PUBLICATIONS

V. Pappas et al, "CloudFence: Data Flow Tracking as a Cloud Service" Computer Science, Columbia University, 2013.

* cited by examiner

*Primary Examiner* — Rehana Perveen
*Assistant Examiner* — Raheem Hoffler
(74) *Attorney, Agent, or Firm* — Matthew C. Zehrer

(57) ABSTRACT

A cooperative data file coloring backup system includes a file color agent (FCA) and a file color storage cloud controller (FCSCC). The FCA assigns a color to a data file. The assigned color is associated with a highest projected data reduction factor achieved when backing up the data file from a host to one of various storage devices comprised within a data backup storage area network. The FCSCC maintains a list of file types and associated data reduction factors that are achieved during a backup of the file types and provides to the FCA a storage path from the host to a particular storage device within the storage area network associated with the highest data reduction factor and file type. The FCA may implement the storage path based upon the assigned color for each backup request received by the host.

20 Claims, 7 Drawing Sheets

ASSIGNING BACKUP DEVICE PATH BASED ON FILE COLORING

FIELD

Embodiments of invention generally relate to storage devices and storage systems and more particularly to assigning a backup device path based on file coloring.

DESCRIPTION OF THE RELATED ART

Because of rapid data growth, data reduction techniques such as de-duplication and compression are useful to reduce the volumes of data in data backup environments that typically include a computer host system that requires a dedicated path to the storage devices to backup data. However, particular data reduction techniques often are not applicable or inconsistent in reducing the size of particular data-types, file-formats, etc.

It is difficult to estimate the storage size requirements for randomly mixed file types stored to a storage system using deduplication or compression in the initial backup planning phase. Likewise, the projection of possible growth of data may be accomplished using not ideal assumptions. A company, APTARE®, provides software to analyze file types of backups which can currently help to plan and estimate the storage-requirements.

Further, changes of a data stream are variable and have a bandwidth. A particular manufacturer of a deduplication system is only able to test and verify a variety of different data or file types to optimize their deduplication or compression algorithm with a specific product. Because of this, a data stream or file type can reach different factors of data reduction on different systems from different vendors.

Data reduction is also based on the homogeneity of the data stream supplied to the data reduction storage system. Meaning, under optimal conditions, data arriving at the storage system should arrive in the same sequence as that of the first backup. If no data was changed by the user, the data reduction factor will rise at each backup of the same data. If the sequence of the files sent to the data reduction capable storage-system changes, the reduction factor can change accordingly. For example, during a file system backup of an operating system, files might not be accessible for backup and are skipped depending on the processes running at the time the backup beings. These changes affect the sequence of the files in the data stream which impacts the data-reduction factor.

Another problem is data compression or deduplication of a particular file type, such as .db or .txt, can achieve different reduction factors on systems manufactured from different vendors. The various data reduction algorithms may be particular to the majority of used file formats optimization of reduction results for the highest use cases. Further, a data reduction factor may change as a function of time during a backup session to a storage system implementing deduplication. As such, various known data reduction methods and systems can provide suboptimal data reduction results.

SUMMARY

In a first embodiment of the present invention, a cooperative data file coloring backup system includes a file color agent (FCA) and a file color storage cloud controller (FCSCC). The FCA assigns a color from a plurality of colors to a data file. The assigned color is associated with a highest projected data reduction factor achieved when backing up the data file from a host to one of various storage devices comprised within a data backup storage area network. The FCSCC maintains a list of file types and associated data reduction factors that are achieved during a backup of the file types to the various storage comprised within the data backup storage area network and provides to the FCA a storage path from the host to a particular storage device within the storage area network associated with the highest data reduction factor and file type.

In another embodiment of the present invention, a cooperative data file coloring backup method includes assigning, with the FCA, a color from a plurality of colors to a data file, the color associated with a highest projected data reduction factor achieved when backing up the file from a host to one of various storage devices comprised within a data backup storage area network, and implementing, with the FCA, a storage path from the host to a particular storage device comprised within the data backup storage area network based upon the assigned color for each backup request received by the host.

In yet another embodiment of the present invention, a computer program product for data file coloring and data file backup includes a computer readable storage medium having program code embodied therewith, the program code executable to: assign, with the FCA, a color from a plurality of colors to a data file, the color associated with a highest projected data reduction factor achieved when backing up the file from a host to one of various storage devices comprised within a data backup storage area network, and implement, with the FCA, a storage path from the host to a particular storage device comprised within the data backup storage area network for backing up the data file based upon the assigned color, for each backup request received by the host.

These and other embodiments, features, aspects, and advantages will become better understood with reference to the following description, appended claims, and accompanying drawings.

DETAILED DESCRIPTION

Figure 1:
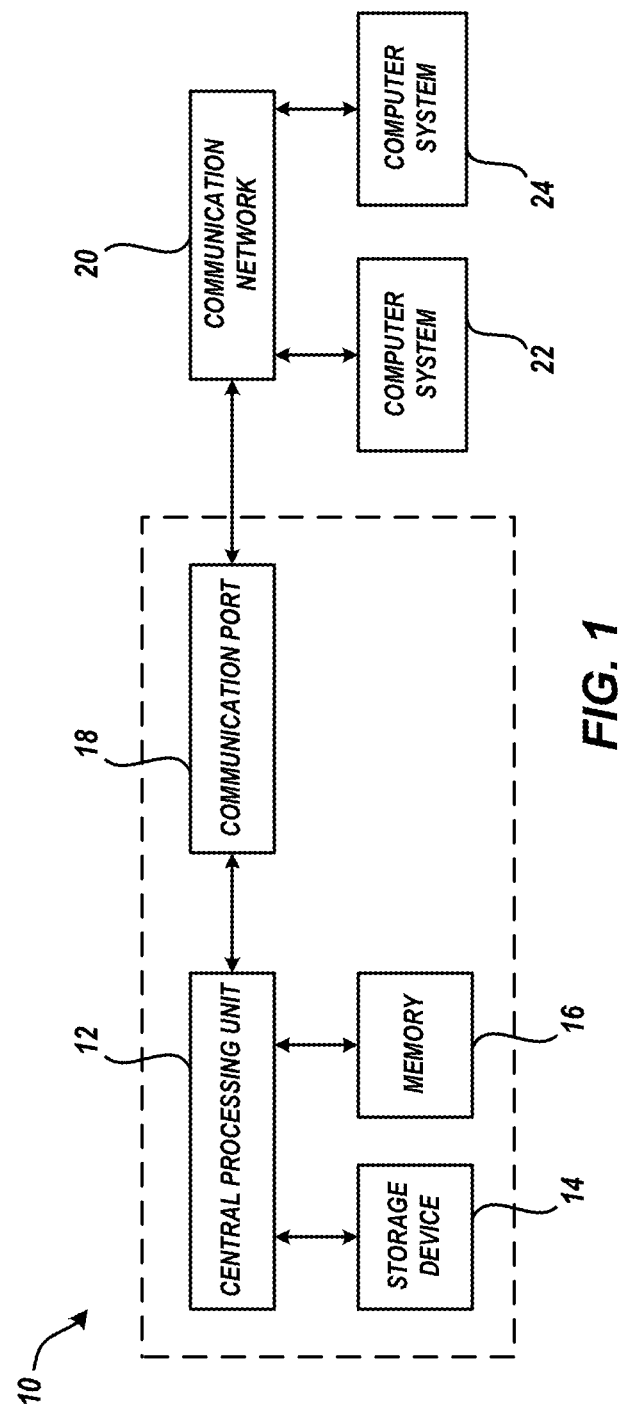
FIG. 1 is a block diagram illustrating an exemplary computing system environment having a storage device in which aspects of the present invention may be realized.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to FIG. 1, a block diagram illustrating an exemplary computing system environment including a storage device in which aspects of the present invention may be realized. The computing system environment may be data handling system 10 that includes central processing unit (CPU) 12, which is connected to communication port 18 and memory device 16. The communication port 18 is in communication with a communication network 20. The communication network 20 and storage network may be configured to be in communication with server (computer, host, processing complex, etc.) 24 and storage systems, which may include storage devices 14. The storage systems may include rotating magnetic disk storage, rotating or static optical drives, magnetic tape storage, hard disk drive (HDD) devices, solid-state devices (SSD) etc., which may be configured, e.g., in a redundant array of independent disks (RAID), just a bunch of disks (JBOD), etc. The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM), field programmable gate array memory (FPGA), random access semiconductor memory (RAM), dynamic random-access memory (DRAM), FLASH memory, or a host of related devices. Memory device 16 and storage devices 14 are connected to CPU 12 via a signal-bearing medium. In addition, CPU 12 is connected through communication port 18 to a communication network 20, having an attached plurality of additional computer host systems 22. In addition, memory device 16 and the CPU 12 may be embedded and included in each component of the system 10. Each storage system may also include separate and/or distinct memory devices 16 and CPU 12 that work in conjunction or as a separate memory device 16 and/or CPU 12.

CPU 12 may execute program instructions stored in memory 16 and, although a single CPU 12 is shown in FIG. 1, it should be understood that a processor complex may have multiple CPUs 16. Memory 16 or a portion of memory 16 may be physically included within the CPU 12 or connected to it via e.g. an internal system bus and may store data and/or program instructions. Though memory 16 is shown conceptually as a single monolithic entity, memory 16 may be arranged as a hierarchy of caches and other memory devices. In some instances, a hierarchy of cache memories is associated with each CPU 12. Memory 16 may include an operating system (OS) and applications. The OS may provide functions such as device drivers or interfaces, management of memory pages, management of multiple tasks, etc. Applications may for example include a storage server software application whereby a network interface may interact with the storage server software application to enable data handling system 10 to be a network storage server.

The system bus may support the transfer of data, commands, and other information between the CPU 12 and peripheral or external devices attached to it, and communication of data which may occur between the external devices independent of CPU 12. The system bus may be structured as multiple buses which may be for example hierarchically arranged and may be connected to other system 10 components (e.g. touch screen, display, touch pad, etc.) and/or to a myriad of external or peripheral devices through a connection hub, through an adapter, a multifunction adapter, directly to network 20, etc.

The system bus may also be connected to communication port 18 (e.g. an I/O adapter connected to an external device, etc.). Communication port 18 may include microcode or firmware and decision logic which may be embodied, e.g., as a message processor, etc. The communication port 18 may also be provided with at least one fast nonvolatile write cache, queues, interrupt registers connected to the message processor 142 and/or decision logic. The communication port 18 may process messages from CPU 12 and generate and transmit response messages back to the CPU 12.

Communication port 18 may contain electronic components and logic to adapt or convert data of one protocol on one bus to another protocol on another bus. Therefore, communication port 18 may connect a wide variety of devices to system 10 via network 20 using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, PCI/PCI-X, FDDI, ATM, 1394, ESCON, wireless relays, Twinax, LAN connections, WAN connections, high performance graphics, etc.

Network 20 may be an internet but could also be any smaller self-contained network such as an intranet, a WAN, a LAN, or other internal or external network using; e.g., telephone transmission lines, cable services, satellites, fiber optics, T1 lines, wireless, etc., and any other various technologies.

Finally, system 10 need not be a computer at all, but may be a simpler appliance-like client device with less memory such as a network terminal, a thin client, a terminal-like device, a voice response unit, mobile device, etc. The system 10 shown in FIG. 1 is intended to be a simplified representation, it being understood that many variations in system configuration are possible in addition to those specifically mentioned here. While system 10 could conceivably be a personal computer system, the system 10 may also be a larger computer system such as a general purpose server or storage server. System 10 and its components are shown and described in FIG. 1 above as a more or less single, self-contained computer system. It is alternatively possible to use multiple modular computer systems that may share a single large database, etc.

Various embodiments of the present invention pertain to methods that may be realized by system 10. When system 10 performs particular as directed from the program instructions stored in memory 16, such system 10 becomes a special purpose system particular to the various methods as described further herein.

Figure 2:
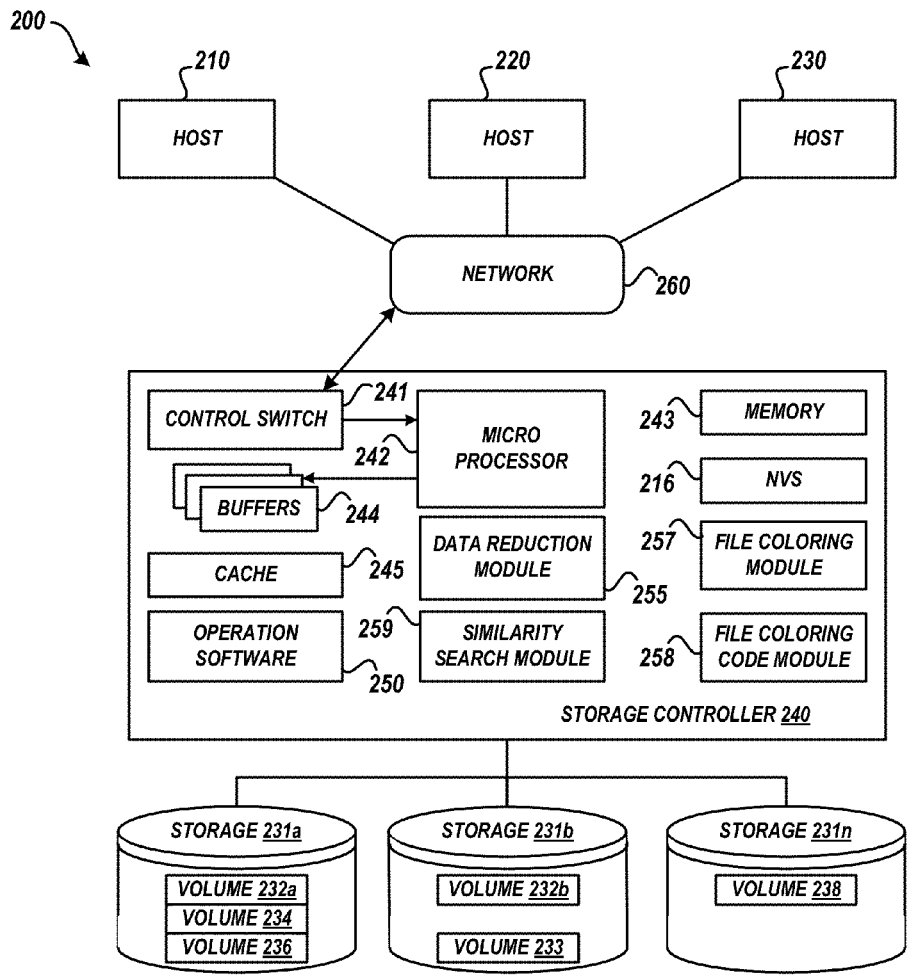
FIG. 2 is a block diagram illustrating a hardware structure of an exemplary data storage system in which aspects of the present invention may be realized.

FIG. 2 is an block diagram showing a hardware structure of an exemplary data storage environment 200 according to various embodiments of the present invention. Host computers 210, 220, 230, are shown each acting as a CPU for performing data processing as part of data storage environment 200. The cluster hosts/nodes (physical or virtual devices), 210, 220, and 230 may be one or more physical devices or logical devices to accomplish the purposes of the present invention.

In one embodiment, by way of example only, a data storage environment 200 may be implemented as IBM® ProtecTIER® deduplication system TS7650G™. A network connection 260 may be a fibre channel fabric, a fibre channel point to point link, a fibre channel over ethernet fabric or point to point link, a FICON or ESCON 1/0 interface, any other 1/0 interface type, a wireless network, a wired network, a LAN, a WAN, heterogeneous, homogeneous, public (i.e. the Internet), private, or any combination thereof. The hosts, 210, 220, and 230 may be local or distributed among one or more locations and may be equipped with any type of fabric (or fabric channel) or network adapter to the storage controller 240, such as Fibre channel, FICON, ESCON, Ethernet, fiber optic, wireless, or coaxial adapters. Data storage environment 200 is accordingly equipped with a suitable fabric or network adaptor(s) to communicate. Data storage environment 200 is depicted in FIG. 2 comprising one or more storage controllers 240 and cluster hosts 210, 220, and 230.

The cluster hosts 210, 220, and 230 may include cluster nodes. To facilitate a clearer understanding of the methods described herein, storage controller 240 is shown in FIG. 2 as a single processing unit, including a microprocessor 242, memory 243 and nonvolatile storage ("NVS") 216. It is noted that in some embodiments, storage controller 240 is comprised of multiple processing units, each with their own processor complex and memory, and interconnected by a dedicated network. Storage 2301 (labeled as 231*a*, 231*b*, and 231*n* in FIG. 2) may be comprised of one or more storage devices, such as storage arrays, which are connected to storage controller 240 (e.g. by a storage network, etc.) with one or more cluster hosts 210, 220, and 230 connected to each storage controller 240.

In some embodiments, the devices included in storage 231 may be connected in a loop architecture. Storage controller 240 manages storage 231 and facilitates the processing of write and read requests intended for storage 231. The memory 243 of storage controller 240 stores program instructions and data, which the processor 242 may access for executing functions and method steps of the present invention for executing and managing storage 231 as described herein. In one embodiment, memory 243 includes, is in association with, or is in communication with the operation software 250 for performing methods and operations described herein. As shown in FIG. 2, memory 243 may also include or be in communication with a cache 245 for storage 23 for buffering "write data" and "read data", which respectively refer to write/read requests and their associated data. In one embodiment, cache 245 is allocated in a device external to memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a system bus for enhanced performance of the storage environment 200. The NVS 216 included in data storage controller is accessible by microprocessor 242 and serves to provide additional support for operations and execution of the present invention as described in other figures. The NVS 216, may also referred to as a persistent cache, or cache memory, and is implemented with nonvolatile memory that mayor may not utilize external power to retain data stored therein. The NVS 216 may be stored in and with the cache 245 for any purposes suited to accomplish the objectives of the present invention. In some embodiments, a backup power source, such as a battery, supplies NVS 216 with sufficient power to retain the data stored therein in case of power loss to the storage environment 200. In certain embodiments, the capacity of NVS 216 is less than or equal to the total capacity of cache 245.

Storage 231 may be physically comprised of one or more storage devices, such as storage arrays. A storage array is a logical grouping of individual storage devices, such as HDD, etc. In certain embodiments, storage 231 is comprised of a JBOD or a RAID array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage environment 200 as shown in FIG. 2 may include a logical volume, or simply "volume," may have different kinds of allocations. Storage 231a, 231b and 231n are shown as ranks in data storage environment 200, and are referred to herein as rank 231a, 231b and 231n. Just as hosts 210, 220, and 230, ranks may be local to data storage environment 200, or may be located at a physically remote location. In other words, a local storage controller may connect with a remote storage controller and manage storage at the remote location. Rank 231a is shown configured with two entire volumes, 234 and 236, as well as one partial volume 232a. Rank 231b is shown configured with a entire volume 233 and with another partial volume 232b. Thus, volume 232 is allocated across ranks 231a and 231b. Rank 230n is shown as being fully allocated to volume 238. That is, rank 231n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data reduction module 255, a file coloring module 257, a file coloring code module 258, and a similarity search module 259. The data reduction module 255, the file coloring module 257, the file coloring code module 258, and the similarity search module 259 may work in conjunction with each and every component of the storage controller 240, the hosts 210, 220, 230, and storage devices 231.

The data reduction module 255, the file coloring module 257, the file coloring code module 258, and the similarity search module 259 may be structurally one complete module or may be associated and/or included with other individual modules. The data reduction module 255, the file coloring module 257, the file coloring code module 258, and the similarity search module 259 may also be located in the cache 245 or other components.

The storage controller 240 may include a control switch 241 for controlling network 260 protocol to the host computers 210, 220, 230, a microprocessor 242 for controlling all the storage controller 240, a nonvolatile control memory 243 for storing a micro program, operation software 250 for controlling the operation of storage controller 240, cache 245 for temporarily storing (buffering) data, buffers 244 for assisting the cache 245 to read and write data, a control switch 241 for controlling a protocol to control data transfer to or from the storage devices 231, the data reduction module 255, the file coloring module 257, the file coloring code module 258, the similarity search module 259, etc. Multiple buffers 244 may be implemented with the present invention to assist with the operations as described herein.

In one embodiment, the host computers or one or more physical or virtual devices, 210, 220, 230 and the storage controller 240 are connected through a network (this could be a fibre channel) 260 as an interface e.g., via at least one switch called fabric.

In one embodiment, the microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, data reduction module 255, the file coloring module 257, the file coloring code module 258, and the similarity search module 259 are in communication with each other and may be separate or one individual component(s). Also, several, if not all of the components, such as the operation software 250 may be included within e.g. memory 243. Each of the components within the devices shown may be linked together and may be in communication with each other for purposes suited to the present invention, via e.g. a bus, etc. As mentioned above, the data reduction module 255, the file coloring module 257, the file coloring code module 258, and the similarity search module 259 may also be located in the cache 245 or other components. As such, the data reduction module 255, the file-coloring module 257, the file coloring code module 258, and the similarity search module 259 maybe used as needed, based upon the storage architecture and users preferences.

In various embodiments, storage controller 240 adds cooperative file coloring protocols in a data reduction system (e.g. a data deduplication system, a data compression system, etc.) and may cluster together the same color files together. For instance, storage controller 240 provides a higher level of granularity (beyond the per file type) of related hash values, to cluster files together by adding cooperative file coloring protocols in a data reduction system assists to increase the functionality and performance of the reduction system.

In one embodiment, by way of example only, a preferred character is represented for file coloring in a file using a code selected from a multiplicity of codes that represent a variety of contexts. The original meaning of the preferred character is retained when representing the preferred character for the file coloring by the code selected from the multiplicity of codes. By adding some unique coloring to each file, files which bear similar and/or identical colors may be classified together thereby allowing for matching new input data (colored) with the reference colored data. The embodiments described herein may be transparent to the end user, server, application(s), etc. and may increase the efficiency in data reduction in the adoption of such techniques. By the embodiments described herein, if a higher level application adheres to a new file-color protocol/standard it may help the data reduction operation identify similar files (those that originated from the same file), as the file-color may be retained throughout the files' life time.

For example, consider the example above, where the "space" character is the preferred choice for file coloring purposes. In the case of text files, a few assumptions are revealed: 1) the "space" character is expected to be the most used character in any text file, and 2) the distribution and/or usage of the "space" characters are expected to be evenly distributed across the entire file, and thus is likely to be found in any reasonable data chunk of the respective file. In the case of binary files the most "popular" character may be any arbitrary character. If indeed, in one embodiment, it is possible to identify a most popular character in a binary file (e.g., a character that its number of appearances in a file is significantly larger by comparison than any other character and also that is evenly spread a cross the file) then that character can be considered the file color, without resorting to any color table standard. The backup storage device (e.g., the VTL) may then cluster all files according to the data chunks/files inherent colors in clusters so, that the search for duplicates can be carried out at least first, against the file's respective color group, and if and only if, that search doesn't produce a most similar match then to look for matches in other clusters.

Moreover, if it is still desired to use a color table for binary files as is done for text files then finding the right color for a "binary" file (where there is no way to know before hand which character is not used) might require an extra phase to ensure that the new-color is indeed available. In other words, in the case of binary files, no particular pattern and/or character is invalid. Thus, it is required to traverse the entire file and map all used-up patterns and only those patterns that are not found may be used as the file-color by changing the most popular character with the unused pattern that turns into the file color. The case might even be that over the lifetime of a file the file's colors changes because a character that was previously "free" turned to be taken in one of its generations. In other words, the file colors may change because a pattern that was not included in the binary file's early generations can all of a sudden appear, and as such, force a need to find a new unused pattern. Such a scenario diminishes the effectiveness of the specific-file-color as old generations will not be matched with newer generation of the same color. If a given pattern (which was not found in the original binary file) appears in the new file data, then the pattern that was used as a color cannot be used as color anymore and new color has to be found from the still unused patterns. The possibility of coloring binary provides for completeness for file coloring. Another approach to address the possibility of file-color change is to create a class of related colors so that if a given color is not available anymore the next color for the file will be picked from the pre-configured color class. For example, the colors Black and Blue may be assigned in the same class (e.g., colors with B as their first character are assigned to a class). If the original file-color was Blue and then the file color was found to turn into a valid data and as such not available, then the new color would be changed to Black. Upon, looking in a data repository, the computing system will look plausibly first for files with Blue color and then with Black color. Another variation of the file-coloring may be multi-level where the prefix of the "color" classifies the file type (such as DB2 or WORD-PRO and the like) and the rest of the color will be allowed to associate the file with particular user/owner and/or file-name, etc.

Figure 3:
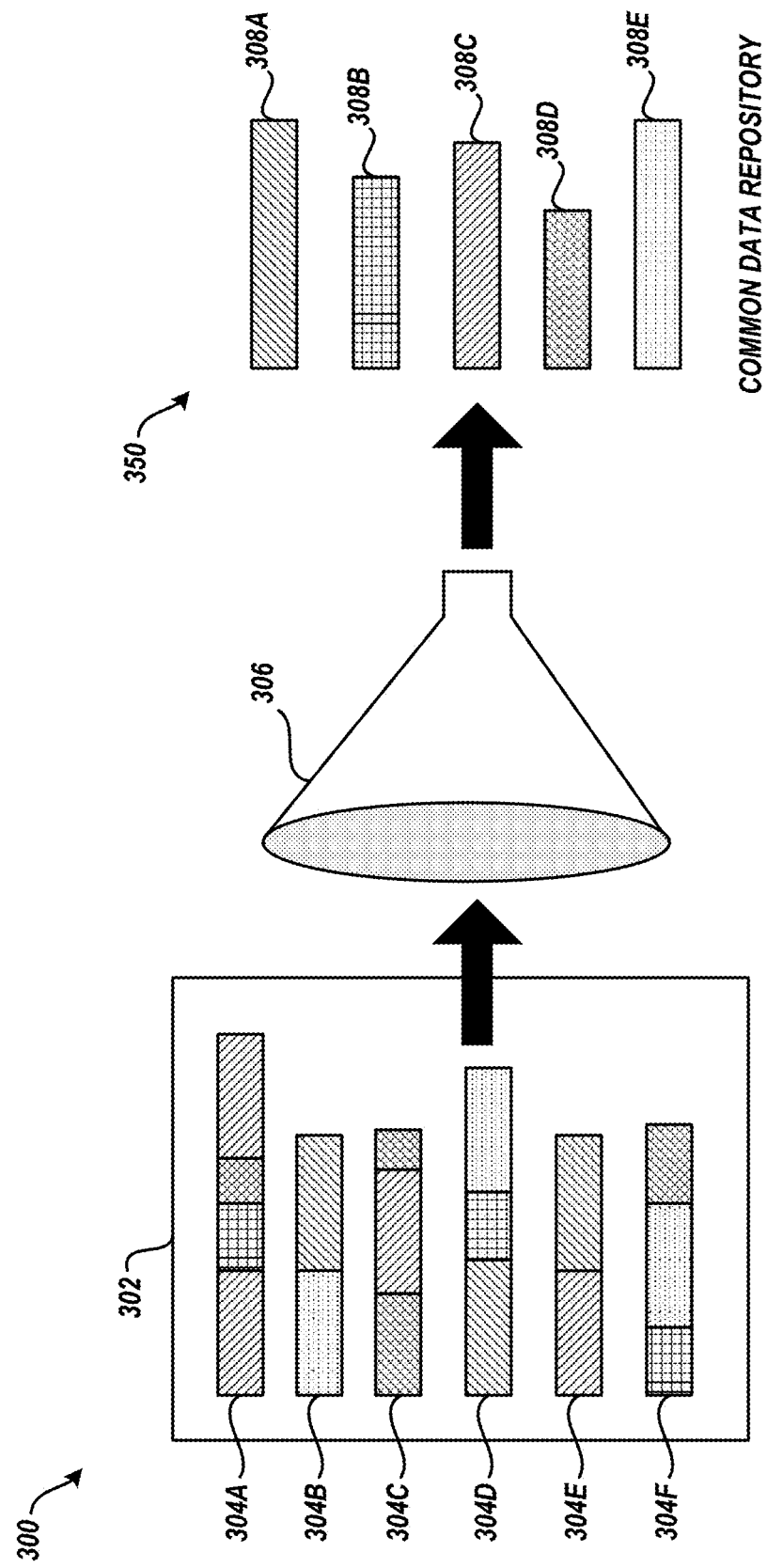
FIG. 3 is a block diagram illustrating a data reduction system with cooperative file coloring protocols for which aspects of the present invention may be realized.

FIG. 3 is a block diagram illustrating a data reduction system with added cooperative file coloring protocols in which aspects of the present invention may be realized. FIG. 3 illustrates the reduction operations, such as data deduplication, data compression, etc. for reducing the amount of data being backed up and then stored by e.g. identifying and eliminating common data in and across the backup storage system using the file coloring protocols. Files in a backup job application 302 are illustrated with six data streams 304 (shown in FIG. 3 as 304A-304F). Each data stream 304 includes various data chunks having a preferred character represented for file coloring for a file using a code selected from a multiplicity of codes that represent a variety of contexts. The original meaning of the preferred character is retained when representing the preferred character for the file coloring by the code selected from the multiplicity of codes. By adding some unique coloring to each file and embedding the file coloring in the data streams for each data chunk, files which bear similar (e.g., same prefix pattern are considered as similar bearing in mind that deduplication is most probable between various generation of the same file and not various generations of similar files) and/or identical colors may be classified, using the classification module 306 together, with the classified results seen in the common data repository 350, thereby allowing for matching new input data (colored) with the reference colored data.

In the common data repository 350, data chunks 308A having a first selected file coloring are matched and stored together with other similarly file colored data chunks 308A from each of the data streams 304A-304F having the first selected file coloring. Further, in the common data repository 350, data chunks 308B having a second selected file coloring are matched and stored together with other similarly file colored data chunks 308B from each of the data streams 304A-304F having the second selected file coloring. Still further, in the common data repository 350, data chunks 308C having a third selected file coloring are matched and stored together with other similarly file colored data chunks 308C from each of the data streams 304A-304F having the third selected file coloring. Likewise, in the common data repository 350, data chunks 308D having a fourth selected file coloring are matched and stored together with other similarly file colored data chunks 308D from each of the data streams 304A-304F having the fourth selected file coloring. Similarly, in the common data repository 350, data chunks 308E having an nth selected file coloring are matched and stored together with other similarly file colored data chunks 308E from the other data streams having the nth selected file coloring. Thus, by the file coloring, the ability to color a file simply by file-type assists in the case of multistreaming 304A-308F as the color is embedded in the chunks 308, regardless of the data stream 304 they arrive on. Moreover, each of the data chunks assembled together from each separate data stream based on the file coloring may also be matched and stored with existing files having similar file coloring that have previously been stored. By identifying similarities of the file coloring between chunks of data encoded using the aforementioned coding scheme by comparing the contexts represented by the Unicode characters the files/data chunks 308 may be reduced based on the level of similarity of the file coloring.

Figure 4:
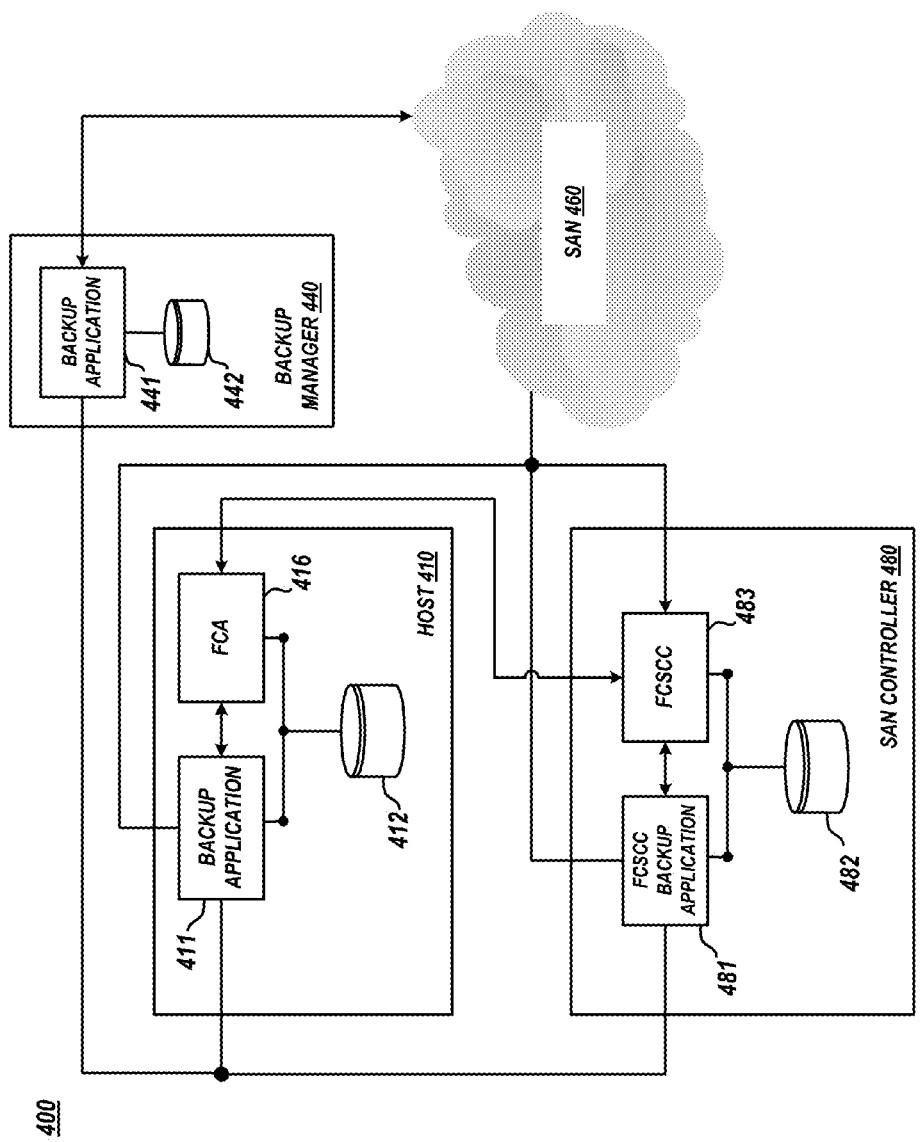
FIG. 4 is a block diagram illustrating a data backup system with added cooperative file coloring protocols in which aspects of the present invention may be realized.

FIG. 4 is a block diagram illustrating a data backup system 400 with cooperative file coloring protocols in which aspects of the present invention may be realized. Backup system 400 includes one or more backup client(s), host(s), 410 such as a CPU 12, data handling system 10, etc., a backup manager 440, such as a backup management server, that controls the access to dedicated types of storage located in a storage area network 460 (SAN), such as a storage cloud, and/or a SAN 460 controller 480 for managing or otherwise controlling data handling operations to, from, or within the storage area network.

In known backup systems, an administration manually configures the storage device paths between the backup system devices and selects the directories and files from a local file system to be stored via e.g. the backup client software to a dedicated storage system. In today's storage cloud environments, a variety of different storage systems and data reduction mechanisms are available. A particular problem of known backup systems is that the administrator or user must know which file-type achieves the best possible data reduction factor upon a particular storage system that may include devices of multiple vendors within various storage cloud providers. The administrator might not have this detailed knowledge to define which storage system and data reduction techniques applies best to reach an optimal data reduction for data backup. Further, when a storage path is defined in a known backup environment, the prior defined files are sequentially stored at the prior defined storage devices and to change this device path, manual intervention is required. Further, in known backup environments, the backup server or client does not have a central database that holds the attached storage systems, their data reduction capabilities and/or network addresses. Even further, due to some known backup systems, practically when backup operations are outsourced or might be operated by a storage service provider, administrators may not know which file types in detail should be stored. This may lead to inefficient data reduction in a storage cloud environment because of the unknown mix of file types that may be stored to the same storage system. Even further, an additional problem of known backup systems is that the storage administrator or user must define a dedicated storage location and the prerequisite of an available path between the host and the storage for data backup processing.

Therefore it is an object of various embodiments of the present invention to group files of the same color and to align the backup sequence of the files to optimize the stream of data increased data reduction and storage efficiency. In certain embodiments, file types and or data structures are analyzed on host 410 by a File Color Agent 416 (FCA). FCA 416 may maintain a local database 412 in which files to be stored or involved in a backup to SAN 460 are assigned a file color which references to the storage device path to SAN 460 to ensure an increased data reduction factor the backup to SAN 460. FCA 416 may cluster files of the same or similar color and may flag not accessible files blocked by the operating system or applications to be backed up at a later point in time. In certain embodiments FCA 416 maintains and optimizes the sequence of the files that are involved in the backup to keep the structure in the data stream as similar as possible. In various embodiments FCA 416 may be a FPGA, ASIC, integrated circuit, etc. or in other embodiments may be an application or operation software 250 running upon e.g. CPU 12, microprocessor 242, etc. In those embodiments where FCA 416 is a hardware device, FCA 416 may further include operation software, backup application 411, etc. to implement those functions of FCA 416 described herein.

In certain embodiments, registered and accessible storage systems with and without data reduction capabilities are maintained by a File Color Storage Cloud Controller 483 (FCSCC). FCSCC 483 may maintain a database 482 to indicate which file type achieves a highest data reduction factor at a particular available storage system within SAN 460. In certain embodiments, the highest data reduction factor of a file-type and associated color may be achieved utilizing an autonomous learning process. FCSCC 483 may provide a path from the referring storage system within SAN 460 to the host 410 via network communication. Using the provided path information from FCSCC 483, FCA 416 may subsequently add or change the path to the storage system within SAN 460 for the requested backup with the corresponding file color for each file-type to reach increased data reduction factors.

In various embodiments, SAN controller 480 may be a storage cloud management server, and in certain embodiments, FCSCC 483 tracks the changes of storage systems, devices, components, configurations, etc. within SAN 460 and monitors, evaluates, etc. the different data reduction factors associated with the file types and colors upon hosts 410.

FCA 416 may include backup client application 411 for maintaining, managing, etc. the database 412, for carrying out the functions of FCA 416, etc. FCA 416 analyzes database 412 and assigns a file color to each file that corresponds to a file format, data type, etc. The assigned file color information may be stored database 412. FCA 416 may query available storage device paths and associated storage color from FCSCC 683 and may cluster the files of the database 412 that may be backed up based upon a file color backup policy. This policy may define the clusters of the file colors that represent the file types and further define to which storage color the cluster should be stored. Additionally, the policy may manage the sequence of the files processed to achieve desired conditions so that e.g. de-duplication algorithms may be invoked upon the assigned storage.

FCSCC 483 may implement a dynamic data reduction factor learning process for evaluation of the data reduction factor of the different file types located on the different storage devices within SAN 460. Using the dynamic data reduction factor learning process, FCSCC 483 may assign a color to each storage device that corresponds to different file types. Further, FCSCC 483 may use the storage color to supply a storage device network path from SAN 460 to the host 410 and/or the backup manager 440 for each backup request from backup application 411. FCSCC 483 may include backup client application 481 for maintaining, managing, etc. a database 482, for carrying out the functions of FCSCC 483, etc.

In certain embodiments, data backup system 400 may include a backup manager 440, such as a backup manager server, that controls the access to dedicated types of storage located in SAN 460 and may include a database 442 and may include backup client application 441 for maintaining, managing, etc. the database 442, for carrying out the functions of backup manager 440, etc. Generally, backup manager 440 may manage the access of physical and virtual tape libraries and keeps the schedules for client applications to start backups. In various embodiments, backup manager 440 may be a TSM Backup Manager Server, Legato Media Server, etc. Database 442 may be utilized by backup application 441 for selecting which storage resource is utilized for its backups. In some embodiments, functionality of backup manager 440 and SAN controller 480 may be combined in a single system. In various embodiments, FCSCC 483 defines paths from backup manager 440 to the storage devices automatically.

For clarity, though database 412, 442, 482 are shown conceptually as single monolithic entities, database 412, 442, 482 may be arranged as a hierarchy or multiple database and/or other memory devices.

In certain embodiments, the backup of files or data structures from host 410 to SAN 460 utilizing the cooperative file coloring protocol utilizes e.g. data reduction module 255, file coloring module 257, file coloring code module 258, classification module 306, etc. to implement one or more functions of e.g. FCA 416, FCSCC 482, etc. within data backup environment 400.

Figure 5:
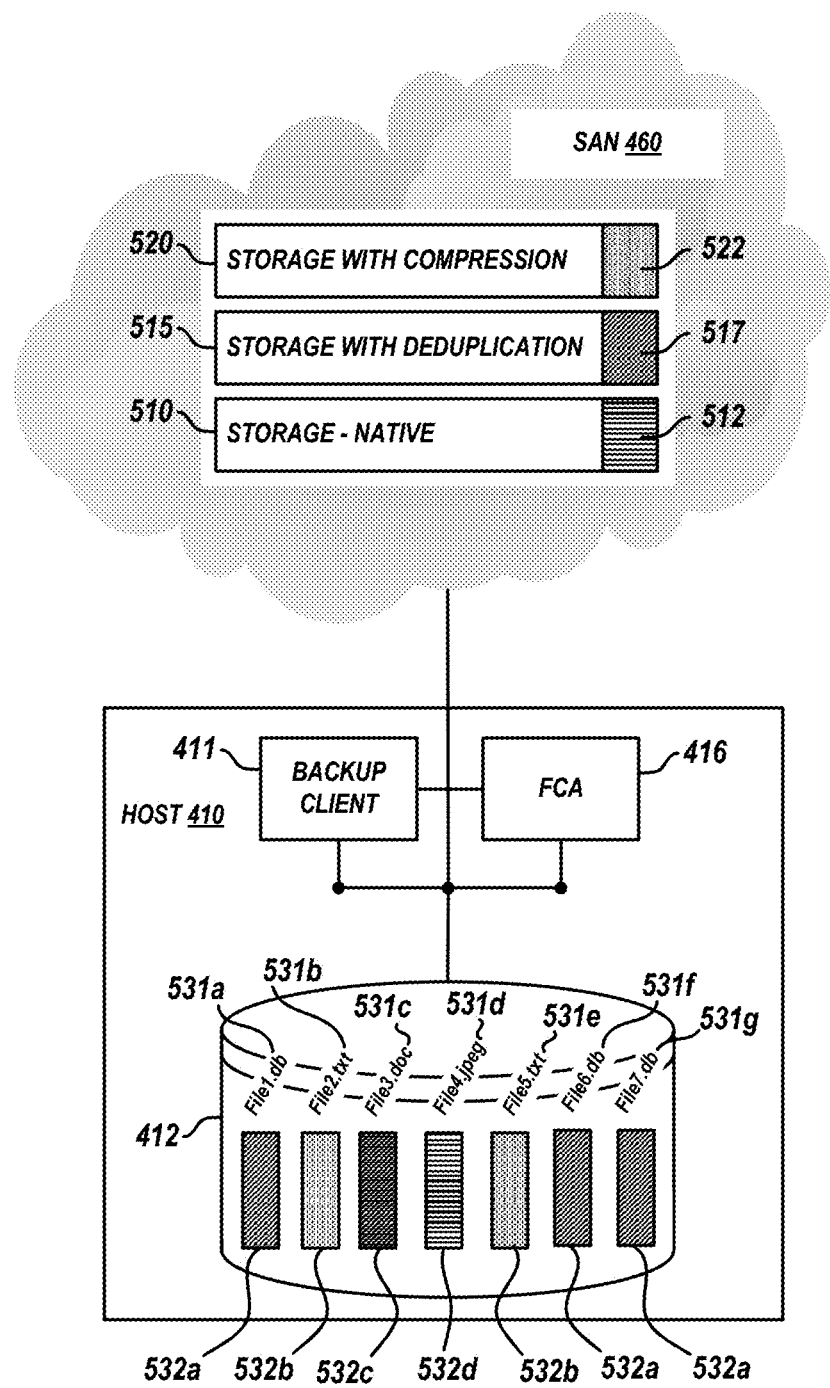
FIG. 5 is a block diagram illustrating a more detailed view of a data backup system in which aspects of the present invention may be realized.

FIG. 5 is a block diagram illustrating a more detailed view of host 410 and SAN 460 in which aspects of the present invention may be realized. In certain embodiments, database 412 stores, contains, etc. various files 531 (shown as files 531a-531g in FIG. 5) or data structures. FCA 416 may conduct a file color assignment process by scanning database 412 and assigning a file color 532 to each file 531 based upon a storage color 512, 517, 522, etc. associated with storage 510, 515, 520, etc. within SAN 460. After the file color assignment process, FCA 416 may cluster one or more files 531 with the same or similar assigned colors 532. Utilizing the clustered files, FCA 416 may generate a backup sequence table (or modify an exiting backup sequence table, etc.) and assign a storage device path with optimal data reduction capabilities to each cluster, file, data structure, etc. For example, files with the same assigned color 532 may be stored to the storage with the corresponding color 512, 517, 522, etc. The backup application 411 may then dynamically configure or implement the paths to the various storage devices of the SAN 460 for processing the backup.

In this manner, the storage 510, 515, 520 may be used as a container holding files of similar or different types that are assigned with multiple, similar, or the same color 532 as the color 512, 517, 522. For example, as shown in FIG. 5, FCA 416 scanned and assigned a similar color to three files of differing formats. FCA 416 may maintain this file cluster and/or other file clusters in a database 412. The cluster information of one or more clusters may be passed to backup application 411 that may process the backup of the one or more clusters after it configures, implements, etc. corresponding backup device paths from e.g. host 410 to SAN 460. Thus, different clusters of files or individual files may be stored to different backup devices without manual intervention.

FCSCC 483 of the SAN controller 480 which has determined which file type reduces best at which storage system(s) or device(s) in SAN 460 and maintains such information in database 482. FCA 416 compares its local file types with the information in FCSCC database 482 and an applicable path to the storage system within san 460 may be identified. FCA 416 may scans database 412 for all the different types of files, like txt or db etc. and builds up an internal database table with the found types. Then FCA 416 queries the FCSCC 483 for the information about which storage colors (e.g. 512, 517, 522, etc.) match those file types. FCA 416 assigns the color 532 associated with the matching storage and the path to the available storage device to the corresponding file at the FCA database 412. In other words, assigned color 532 is chosen from a plurality of colors e.g. 532a-532d corresponding with a storage color (e.g. 512, 517, 522, etc.) that has a highest predicted data reduction factor achieved by the various storage devices, apparatuses, systems, etc. within SAN 460 during the backup of the underlying file type, file type cluster, or data structure. On the next backup, FCA 416 queries FCSCC 482 for updated information, and if nothing changed, the assigned colors 532 and device paths stay the same. If there is a change of how storage colors (e.g. 512, 517, 522, etc.) correspond to the assigned color 532 of a file (i.e. new technology was implemented within SAN 460, etc.) a new corresponding color 532 will be assigned the file and as well the corresponding device path will be changed to the new storage device that may provide a better reduction factor.

Figure 6:
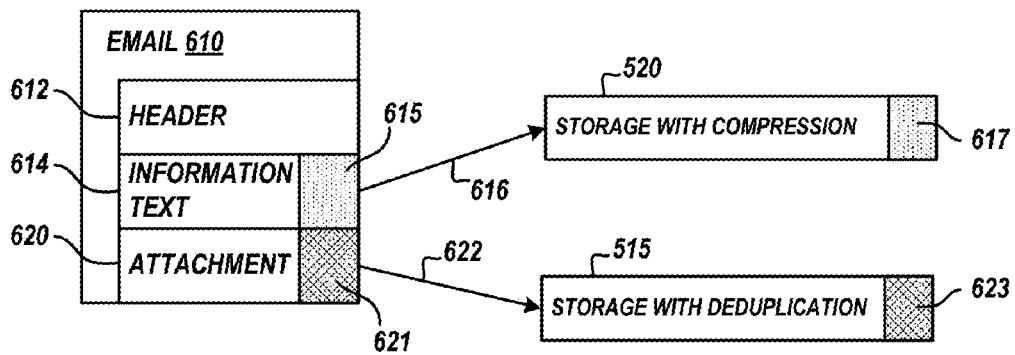
FIG. 6 is a block diagram illustrating an exemplary file backup utilizing a data backup system that includes cooperative file coloring protocols, according to various embodiments of the present invention.

FIG. 6 is a block diagram illustrating an exemplary file backup utilizing a data backup system that includes cooperative file coloring protocols, according to various embodiments of the present invention. Shown in FIG. 6 is an email file 610 that may include a header 612, text 614, and/or an attachment 620. In known backup techniques of a compound file such as an email with header, text, and attachment, the compound file is sequentially stored via a storage network to an attached storage device. This leads to suboptimal data reduction in a storage cloud environment since an unknown mix of file types, sub files, etc. are stored in the same storage system.

Therefore, it is an object of certain embodiments of the present invention that FCA 416 conduct a file color assignment process by scanning database 412 and assigning a file color 615, 621 to each file or sub file based on a corresponding storage color 617, 623. For example, subsequent to FCA 416 scanning and analyzing, email file, FCA 416 assigns a storage color 615 to text 412 and assigns a storage color 621 to the attachment 620. FCA 416 assigns color 615, 621 from a plurality of colors e.g. 532a-532d that is associated with a highest data reduction factor achieved by the various storage devices, apparatuses, systems, etc. within SAN 460 associated with the backup of text 614 and attachment 620, respectively. For example, based on the storage colors e.g. 617, 623, the backup application 411 may assign a storage path 616 to separately store text 614 of email file 810 to a dynamically assigned associated storage 520 with most applicable or most efficient data reduction capabilities and/or may assign a storage path 622 to separately store attachment 620 of email file 810 to a dynamically assigned associated storage 515 with most applicable or most efficient data reduction capabilities. In certain embodiments, a data structure, file, or sub file may not undergo backup processes. For instance, header 612 does not require being stored as it can be reconstructed from text 614 and the kind, the size, amount, etc. of corresponding attachments 620.

Figure 7:
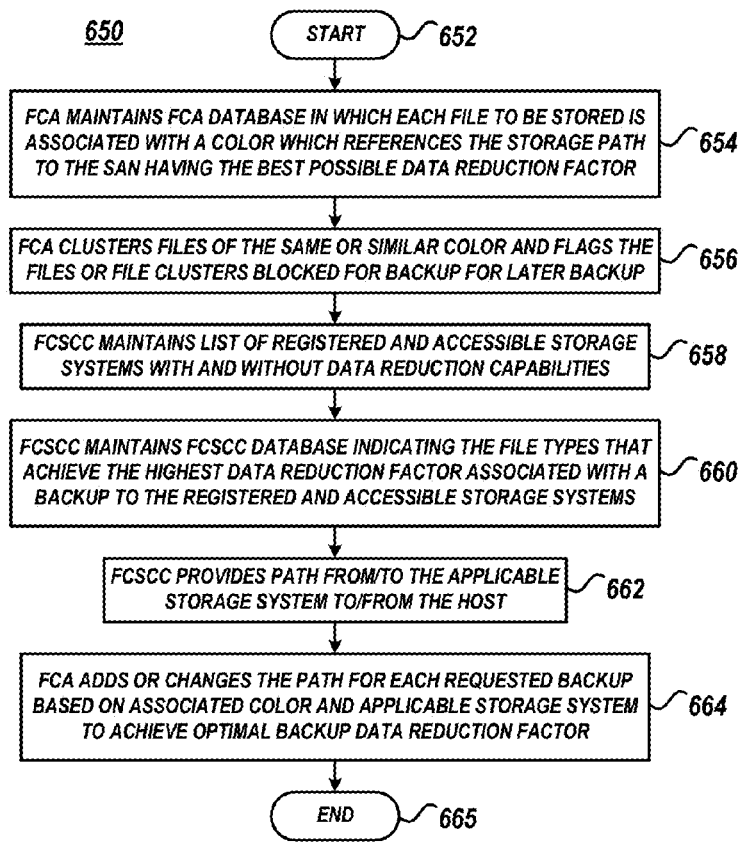
FIG. 7 depicts a block diagram of a cooperative file coloring protocol method, according to various embodiments of the present invention.

FIG. 7 depicts a block diagram of a cooperative file coloring protocol method 650, according to various embodiments of the present invention. Method 650 begins at block 502 and continues with file types and or data structures being analyzed on host 410 by FCA 416. FCA 416 maintains a local database in which files to be stored are associated with a file color which references to the storage device path to ensure an increased data reduction factor for storage within SAN 460 (block 654). FCA 416 clusters files of the same or similar color and flags not accessible files blocked from being backed up for backup at a later point in time (block 656). In certain embodiments FCA 416 e.g. clusters similar file or data structures to maintain and optimizes the sequence of the files to keep the structure in the data stream in a backup processes as similar as possible.

Method 650 continues with FCSCC 483 maintains in a FCSCC database 482 a list of registered and accessible storage systems with and without data reduction capabilities (block 658). The list may further indicate the file types and data structures that achieves a highest data reduction factor and associated storage systems within SAN 460 (block 660). In certain embodiments, the highest data reduction factor of a file type and associated color may be achieved utilizing an autonomous learning process. An exemplary autonomous learning process is shown in FIG. 8.

Method 650 continues with FCSCC 482 provide a path to or from the applicable storage system within SAN 460 to or from the host 410 via network communication (block 662). FCA 416 may add or change the path to the storage system within SAN 460 for the requested backup with the corresponding file color for each file type to reach increased data reduction factors (block 664). Method 650 ends at block 665.

Figure 8:
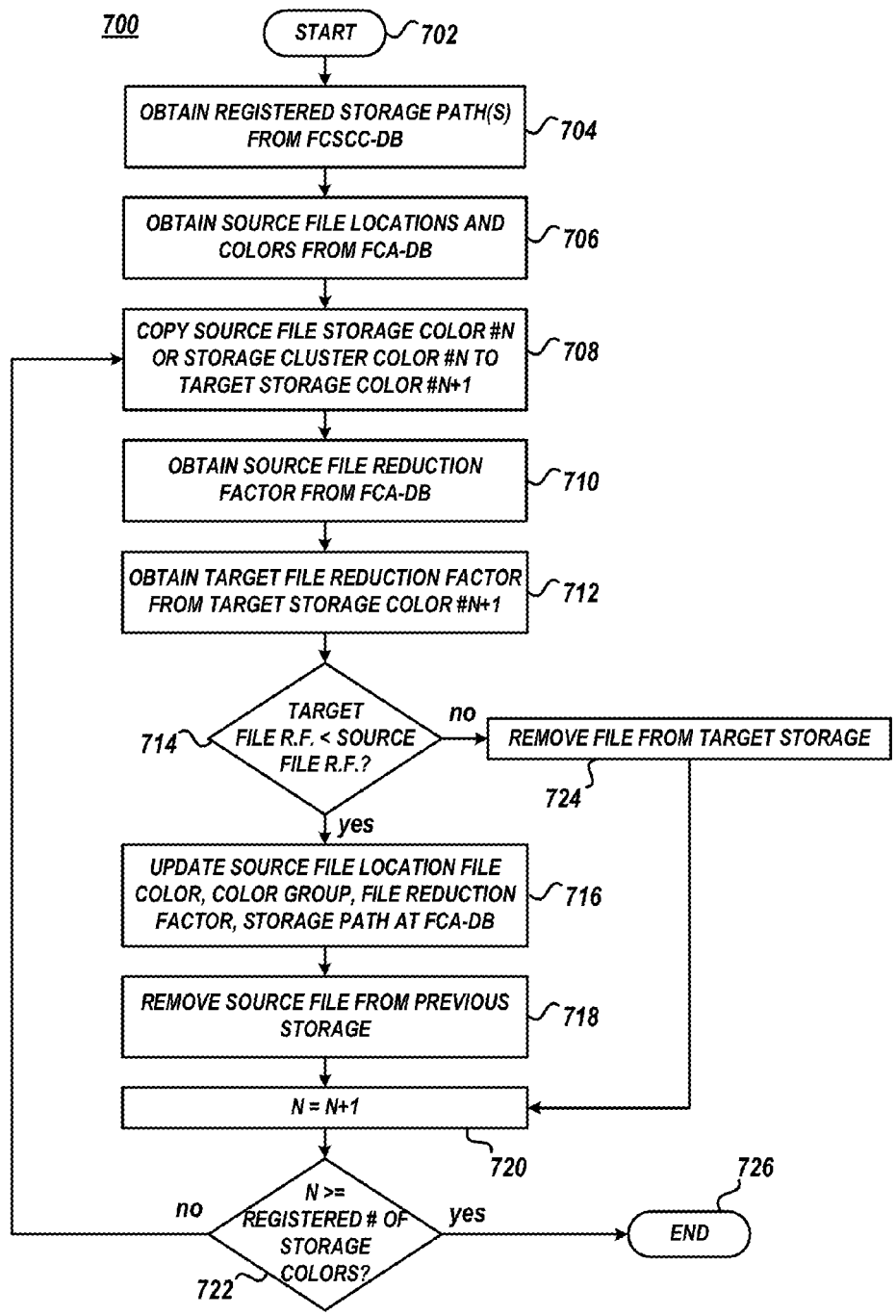
FIG. 8 depicts a block flow diagram of a dynamic data reduction factor learning method, according to various embodiments of the present invention.

FIG. 8 depicts a block flow diagram of a dynamic data reduction factor learning method 700 e.g. for the evaluation of data reduction factors of the various file types located within SAN 460. In certain embodiments, method 700 may be implemented to determine a highest data reduction value in a cloud storage environment. In various embodiments, method 700 copies the files or clustered files in a color group to a storage device, storage system, etc. within SAN 460.

Method 700 beings at block 702 and continues with FCSCC 483 obtaining one or more storage paths from FCSCC database 482 (block 704). In certain embodiments, the storage path may define a direct route from a storage system within SAN 460 to and or from host 410 via e.g. network communication. In other embodiments, the storage path may define an indirect route from a storage system within SAN 460 to and or from host 410 via SAN controller 480 and/or backup manager 440, etc.

Method 700 continues with FCA 416 obtaining source file, file cluster, etc. locations and associated color(s) from FCA database 412 within host 410 (block 706). The source file or source file cluster is copied from database 412 to a target storage within SAN 460. For example, a source file with a color "N" or a source file cluster with color "N" is copied to target storage "N+1" that is associated with color "N" within SAN 460 (block 708).

Method 700 continues with FCA 416 obtaining and verifying a source file reduction factor from FCA database 412 (block 710) and obtaining and verifying a target file reduction factor from the target storage within SAN 460 (block 712). FCA 416 compares the target file reduction factor and the source file reduction factor (block 714). If the target file reduction factor is larger than the source file reduction factor, the method 700 continues with FCA 416 updating FCS database 412 with the new file location, file color, cluster color, reduction factor, and storage device path (e.g. source location=target-location) (block 716).

Method 700 continues with FCA 416 removing the file from the previous source storage system to free the space (block 718). FCA 416 increments a corresponding index to the next storage system color in SAN 460 (block 720) and determines whether all registered storage system colors have been verified (block 722).

If all registered storage system colors have not been verified (e.g. the end of a list of registered storage systems is not reached, etc.), method 700 returns to block 708, where the original source file is copied to the next target storage with SAN 460. FCA 416, in turn, queries the source file reduction factor and queries the target file reduction factor and compares the reduction factors. Now, if target file reduction factor is not larger than the source file reduction factor, the file on the target system is removed to free the storage because no improvement was determined on this system with the used file type (block 724). Optionally, a cross check may verify whether the target file reduction factor is smaller or equal than the file on the source-system. If the result of the cross checks is negative, method 700 and ends with an error. Method 700 continues when the target file reduction factor is larger than or equal to the source file reduction factor, with removing the file on the target system to free the storage because no improvement was determined on this system with the used file type (block 724). Method 700 continues by returning to block 720 by incrementing the corresponding index to the next storage system color in NAS 460. If all registered storage system colors have been verified in block 722, method 700 ends at block 726.

In various embodiments, method 700 determines the best available data reduction factor for different types of files and eliminates the use of pre analysis software like APTARE or the use of calculators for data reduction estimations. If method 700 determines or identifies a particular storage system that provides a higher data reduction factor at the target storage system as the source storage-system, FCA database 412 and or the backup manager database 442 with is updated with the new file location information, etc. and removes the file(s) to free up space in the source storage system. By monitoring current bandwidth of SAN 460, the storage environment can manage to move files to another storage location to improve data reduction. Further, a possibility of overloading SAN 460 may be eliminated by managing or limiting the number of files copied utilizing parallel processes.

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A cooperative data file coloring backup method comprising:
   maintaining, with a file color storage cloud controller (FCSCC) within a storage management server communicatively connected to a host computing device, a list of file types and associated data reduction factors that are achieved during a backup of each file type to each storage device having data reduction capabilities comprised within a data backup storage area network,
   assigning, by the FCSCC within the list of file types and associated data reduction factors, storage device colors to each storage device, wherein each storage device color is assigned to a storage device and is associated with a file type and data reduction factor achieved during the backup of the file type to the storage device;
   assigning, with a file color agent (FCA) within the host computing device, a file color from a plurality of file colors to a data file stored within the host computing device, the assigned file color matching the storage device color that is associated with a highest data reduction factor achieved during the backup of the file type of the data file, and;
   subsequent to the host computing device receiving a backup request to backup the data file to the data backup storage area network, implementing, with the FCA, a path from the data file to a particular storage device within the data backup storage area network that has assigned the same storage device color as the assigned file color of the data file.

2. The cooperative data file coloring backup method of claim 1, further comprising:
   clustering, with the FCA, data files with same or similar assigned file colors within the host computing device.

3. The cooperative data file coloring backup method of claim 1, further comprising:
   flagging, with the FCA, data files that are blocked from the backup.

4. The cooperative data file coloring backup method of claim 1, further comprising:
   providing to the FCA, with the FCSCC, the path from the data file to the particular storage device within the data backup storage area network that has assigned the same storage device color as the assigned file color of the data file.

5. The cooperative data file coloring backup method of claim 1,
   dynamically determining, with the FCA and with the FCSCC, data reduction factors associated with the backup of each file type to a each storage device comprised within the data backup storage area network.

6. The cooperative data file coloring backup method of claim 5, wherein dynamically determining projected data reduction factors further comprises:
   obtaining, with the FCSCC, a plurality of storage paths from the host computing device to each storage device comprised within the storage area network, and;
   obtaining, with the FCA, a plurality of source file types and assigned file colors associated with each of the plurality of source file types.

7. The cooperative data file coloring backup method of claim 6, wherein dynamically determining projected data reduction factors further comprises:
   obtaining, with the FCA, a source file color associated with a particular source file type, and;
   obtaining, with the FCSCC, a storage device color associated with a individual storage device comprised within the storage area network.

8. The cooperative data file coloring backup method of claim 7, wherein dynamically determining projected data reduction factors further comprises:
   comparing, with the FCA, the obtained source file color with the obtained storage device color associated with the individual storage device.

9. The cooperative data file coloring backup method of claim 8, wherein dynamically determining projected data reduction factors further comprises:
   updating, with the FCA, the assigned source file color if the data reduction factor associated with backing up the source file type to the individual storage device is greater than a preexisting highest source file type data reduction factor.

10. The cooperative data file coloring backup method of claim 1, wherein the FCA is an application specific integrated circuit within the host computing device.

11. The cooperative data file coloring backup method of claim 1, wherein the FCA is an field programmable gate array within the host computing device.

12. A computer program product for data file coloring and data file backup, the computer program product comprising a non-transitory computer readable storage medium having program code embodied therewith, the program code executable to:
   maintain, with a file color storage cloud controller (FCSCC) within a storage management server communicatively connected to a host computing device, a list of file types and associated data reduction factors that are achieved during a backup of each file type to each storage device having data reduction capabilities comprised within a data backup storage area network;
   assign, by the FCSCC within the list of file types and associated data reduction factors, storage device colors to each storage device, wherein each storage device color is assigned to a storage device and is associated with a file type and data reduction factor achieved during the backup of the file type to the storage device;
   assign, with a file color agent (FCA) within the host computing device, a file color from a plurality of file colors to a data file stored within the host computing device, the file color matching the storage device color that is associated with a highest data reduction factor achieved during the backup of the file type of the data file, and;
   subsequent to the host computing device receiving a backup request to backup the data file to the data backup storage area network, implement, with the FCA, a path from the data file to a particular storage device within the data backup storage area network that has assigned the same storage device color as the assigned file color of the data file.

13. The computer program product of claim 12, wherein the program code is further executable to:
   cluster, with the FCA, data files with same or similar assigned file colors within the host computing device.

14. The computer program product of claim 12, wherein the program code is further executable to:

provide to the FCA, with the FCSCC, the path from the data file to the particular storage device within the data backup storage area network that has assigned the same storage device color as the assigned file color of the data file.

15. The computer program product of claim 12, wherein the program code is further executable to:
dynamically determine, with the FCA and with the FCSCC, data reduction factors associated with the backup of each file type to a each storage device comprised within the data backup storage area network.

16. The computer program product of claim 15, wherein the program code for dynamically determining projected data reduction factors is further executable to:
obtain, with the FCSCC, a plurality of storage paths from the host to each storage device comprised within the storage area network, and;
obtain, with the FCA, a plurality of source file types and assigned file colors associated with each of the plurality of source file types.

17. The computer program product of claim 16, wherein the program code for dynamically determining projected data reduction factors is further executable to:
obtain, with the FCA, a source file color associated with a particular source file type;
obtain, with the FCSCC, a storage device colors associated with a individual storage device comprised within the storage area network;
compare, with the FCA, the obtained source file color with the obtained storage device colors associated with the individual storage device, and;
update, with the FCA, the assigned source file color if the data reduction factor associated with backing up the source file type to the individual storage device is greater than a preexisting highest source file type data reduction factor.

18. The computer program product of claim 12, wherein the FCA is an application specific integrated circuit within the host computing device.

19. The computer program product of claim 12, wherein the FCA is an field programmable gate array within the host computing device.

20. A cooperative data file coloring backup system comprising: a file color storage cloud controller (FCSCC) within a storage management server communicatively connected to a host computing device comprising a file color agent (FCA);
wherein the storage management server is a hardware device:
wherein the FCSCC maintains a list of file types and associated data reduction factors that are achieved during a backup of each file type to each storage device having data reduction capabilities comprised with a data backup storage area network and wherein the FCSSS assigns, within the list of file types and associated data reductions factors, storage device colors to each storage device, wherein each storage device color is assigned to a storage device and is associated with a file type and data reduction factor achieved during the backup of the file type to the storage device:
wherein the FCA assigns a file color from a plurality of file colors to a data file stored within the host computing device, the assigned file color matching the storage device color that is associated with a highest data reduction factor achieved during the backup of the file type of the data file;
and wherein subsequent to the host computing device receiving a backup request to backup the data file to the data backup storage area network, the FCA implements a path from the data file to a particular storage device within the data backup storage area network that has assigned the same storage device color as the assigned file color of the data file.

* * * * *